(12) United States Patent
Mun et al.

(10) Patent No.: US 11,295,365 B1
(45) Date of Patent: Apr. 5, 2022

(54) METHOD FOR PROVIDING INFORMATION OF PRODUCT BRANDS AND ELECTRONIC APPARATUS THEREFOR

(71) Applicant: Coupang Corp., Seoul (KR)

(72) Inventors: Jun Young Mun, Seoul (KR); Hyang Eun Kim, Seoul (KR); Yoon Mi Park, Seoul (KR); Jin Hyeong Park, Seoul (KR); Jeong Soo Park, Seoul (KR); Nam Gyun Jo, Seoul (KR); Ha Young Choi, Seoul (KR); Jee Eun Park, Seoul (KR)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 17/221,630

(22) Filed: Apr. 2, 2021

(30) Foreign Application Priority Data

Mar. 4, 2021 (KR) .......................... 10-2021-0028919

(51) Int. Cl.
*G06Q 30/06* (2012.01)
(52) U.S. Cl.
CPC ..... *G06Q 30/0629* (2013.01); *G06Q 30/0631* (2013.01); *G06Q 30/0643* (2013.01)
(58) Field of Classification Search
CPC ........... G06Q 30/0623; G06Q 30/0629; G06Q 30/0631; G06Q 30/0643
USPC ..................................................... 705/26.64
See application file for complete search history.

(56) References Cited

U.S. PATENT DOCUMENTS

| 2010/0281029 A1* | 11/2010 | Parikh | G06Q 10/04 707/741 |
| 2012/0023086 A1* | 1/2012 | Ishag | G06F 16/951 707/706 |
| 2013/0080288 A1* | 3/2013 | Westphal | G06Q 30/0625 705/26.7 |
| 2014/0044358 A1* | 2/2014 | Srinivasan | G06Q 50/01 382/190 |

(Continued)

FOREIGN PATENT DOCUMENTS

| EP | 2533141 A1 * | 12/2012 | G06F 16/93 |
| KR | 10-2009-0093472 A | 9/2009 | |

(Continued)

OTHER PUBLICATIONS

Meethongjan, Kittikhun; Surinwarangkoon, Thongchai; Hoang, Vinh Truong., Dec. 2020, Ahmad Dahlan University, 18.6: 3019-3025. (Year: 2020).*

(Continued)

*Primary Examiner* — Jason B Dunham
*Assistant Examiner* — Thomas Joseph Sullivan
(74) *Attorney, Agent, or Firm* — Knobbe, Martens, Olson & Bear, LLP

(57) ABSTRACT

The present disclosure relates to a method of providing product information, the method including identifying a product corresponding to a request from a user, verifying whether a category of the product is included in a first category for which brand information is additionally provided, identifying, when the product belongs to the first category, logo content mapped based on brand information of the product identified from information on or regarding the product, and providing, in response to the request, a page related to a product in which the brand information of the product including the identified logo content is displayed in a first area.

14 Claims, 11 Drawing Sheets

(56) References Cited

U.S. PATENT DOCUMENTS

| | | | |
|---|---|---|---|
| 2014/0188934 A1* | 7/2014 | Datta | G06F 16/24553 |
| | | | 707/771 |
| 2015/0170209 A1* | 6/2015 | Smith | G06Q 30/0267 |
| | | | 705/14.64 |
| 2015/0206227 A1* | 7/2015 | Borom | G06Q 30/0639 |
| | | | 705/26.7 |
| 2018/0033064 A1* | 2/2018 | Varley | G06F 16/56 |

FOREIGN PATENT DOCUMENTS

| | | |
|---|---|---|
| KR | 10-0963996 B1 | 6/2010 |
| KR | 10-2015-0005766 A | 1/2015 |
| KR | 10-2016-0087091 A | 7/2016 |
| KR | 10-2016-0131699 A | 11/2016 |
| KR | 10-2017-0109159 A | 9/2017 |
| KR | 10-2023629 B1 | 9/2019 |
| KR | 10-2020-0139561 A | 12/2020 |
| KR | 10-2021-0014468 A | 2/2021 |
| WO | WO 2019-191241 A1 | 10/2019 |

OTHER PUBLICATIONS

Meethongjan, Kittiknun; etal, Dec. 2020, Anmad Dahlan University, 18.6: 3019-3025 (Year: 2020).*

Changbo, Hu et al., "A Multimodal Fusion Framework for Brand Recognition from Product Image and Context", Jul. 2020, IEEE (Year: 2020).*

\* cited by examiner

METHOD FOR PROVIDING INFORMATION OF PRODUCT BRANDS AND ELECTRONIC APPARATUS THEREFOR

BACKGROUND

Technical Field

The present disclosure relates to a method of providing brand information of a product and an electronic apparatus therefor.

Description of the Related Art

In online stores, users can purchase a variety of products. Among the products available for purchase in online stores, some products have a clear customer preference for a specific brand, such as fashion products. However, when the online store manager and the individual product seller are different, the online store may provide only information based on product information received from the seller to the user. For this reason, it may not be easy for the user to find the brand information of the product on the web page of the online store.

PRIOR DOCUMENT

Korean Patent Laid-Open Publication No. 10-2015-0005766

The prior document relates to a method for each user to create and manage content related to a brand, and has an effect that influence on the brand can be formed by the user. However, the prior document relates to generating content related to a brand by each user, and does not disclose a method of providing logo content of a specific brand based on whether the product sold in the online store is a product of the corresponding brand. Therefore, there is a desire for a method to increase a visibility of product brand information in online stores.

SUMMARY

Technical Goals

An aspect provides a method of providing brand information of a product and an apparatus therefor. However, the goals to be achieved by example embodiments of the present disclosure are not limited to the objectives described above and other objects may be inferred from the following example embodiments.

Technical Solutions

According to an aspect, there is provided a method of providing product information by an electronic apparatus, the method including identifying a product corresponding to a request from a user, verifying whether a category of the product is included in a first category for which brand information is additionally provided, identifying, when the product belongs to the first category, logo content mapped based on brand information of the product identified from information on or regarding the product, and providing, in response to the request, a product-related page in which the brand information of the product including the identified logo content is displayed in a first area, wherein the brand information further includes at least one of a brand name of the product and a link of a page providing information on a product set of a same brand as a brand of the product.

According to another aspect, there is also provided an electronic apparatus for providing brand information of a product, the electronic apparatus including a memory in which at least one instruction is stored and a processor, the processor being configured to execute the at least one instruction to identify a product corresponding to a request from a user, verify whether a category of the product is included in a first category for which brand information is additionally provided, identify, when the product belongs to the first category, logo content mapped based on brand information of the product identified from information on the product, and provide, in response to the request, a product-related page in which the brand information of the product including the identified logo content is displayed in a first area, wherein the brand information further includes at least one of a brand name of the product and a link of a page providing information on a product set of a same brand as a brand of the product.

According to another aspect, there is also provided a non-transitory computer-readable recording medium including a computer program for performing the above-described method.

Details of other example embodiments are included in the following detailed description and the accompanying drawings.

Effects

According to example embodiments, when brand information of a specific product is identified among products available for purchase in an online store system, an electronic apparatus may display logo content mapped to a brand of the corresponding product so that a user easily identifies a product of the corresponding brand.

Further, by providing information on a product of a specific brand to a user on a separate page so that products are identified as the specific brand, it is possible to improve shopping convenience for users who are interested in products of the corresponding brands.

Effects of the present disclosure are not limited to those described above and other effects may be made apparent to those skilled in the art from the following description.

DETAILED DESCRIPTION

The terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

Figure 1:
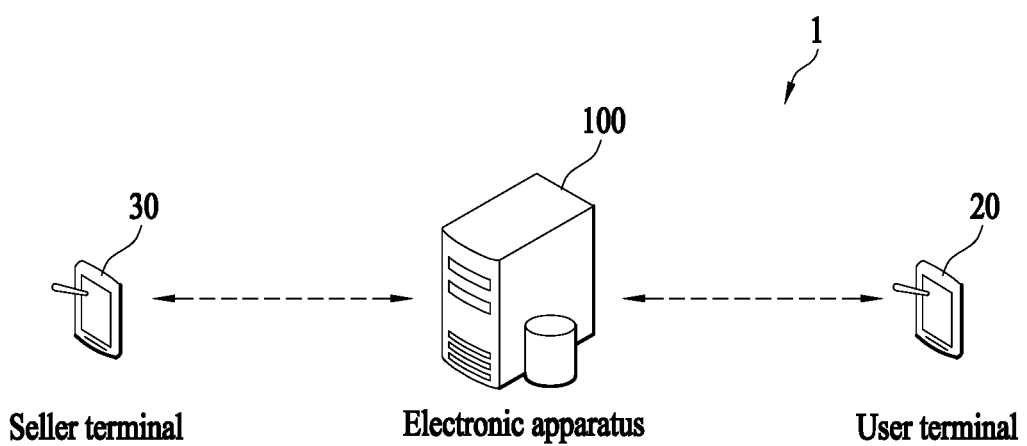
FIG. 1 illustrates an online store system according to some example embodiments.

FIG. 1 illustrates an online store system according to some example embodiments.

Referring to FIG. 1, an online store system 1 may include an electronic apparatus 10, a user terminal 20, and a seller terminal 30. FIG. 1 shows components related to the online store system 1 of the present embodiment. Accordingly, it would be understood by those skilled in the art that general-purpose components other than the components shown in FIG. 1 may be further included.

The electronic apparatus 10, the user terminal 20, and the seller terminal 30 may communicate with one another within a network. The network may include any one or combinations of a local area network (LAN), a wide area network (WAN), a value added network (VAN), a mobile radio communication network, and a satellite communications network. Also, the network is a comprehensive data communication network that allows network components to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultra wideband (UWB), infrared Data Association (IrDA) communication, and near field communication (NFC) but not is limited thereto.

The electronic apparatus 10 may operate the online store system 1. Specifically, a seller may transmit information on or regarding a sale product to the electronic apparatus 10 through the seller terminal 30. The electronic apparatus 10 may generate a product-related page based on the information on the sale product and provide the product-related page to the user terminal 20. By accessing an online store through the user terminal 20, a user may identify products available for purchase on the online store, which are provided by the electronic apparatus 10. The user may select some products and proceed with the purchase.

When the user searches for a specific product or requests detailed information on the specific product through the user terminal 20, the electronic apparatus 10 may verify whether the corresponding product is a product belonging to a first category. Here, the first category may refer to a category for which brand information such as logo content is provided. Also, the first category may be a category that customer's preferences for some brands are relatively large. The first category may be, for example, clothing/accessories but is not limited thereto.

When the corresponding product belongs to the first category, the electronic apparatus 10 may verify whether the corresponding product is a product of a specific brand based on product information received from the seller terminal 30. When the corresponding product is the product of the specific brand, the electronic apparatus 10 may provide brand information including identified logo content to the user terminal 20.

The electronic apparatus 10 may provide a platform for the online store. Specifically, the electronic apparatus 10 may provide an application for using the online store to the user terminal 20. The electronic apparatus 10 may execute the application and purchase a product. In addition, the electronic apparatus 10 may provide an application for uploading product information to the seller terminal 30. Also, instead of providing a separate application for the seller terminal 30, the electronic apparatus 10 may provide a function for the seller to upload product information on the platform for the online store. For example, the electronic apparatus 10 may be included in a server that operates the online store.

Figure 2:
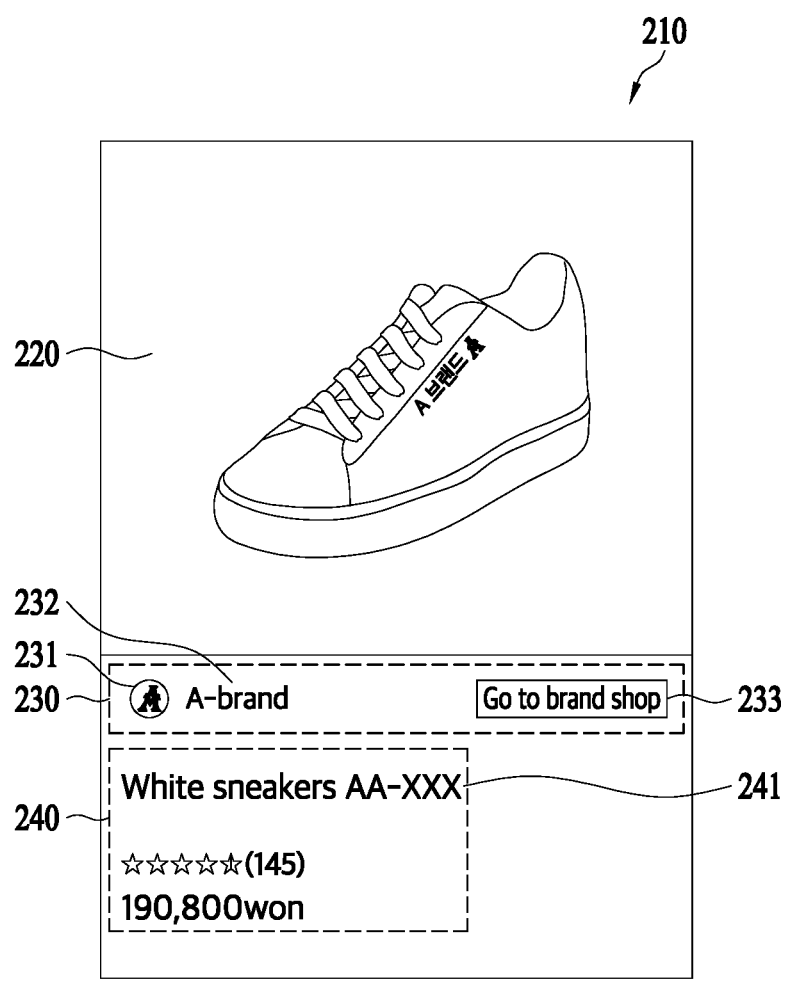
FIG. 2 is a diagram illustrating a product detail page according to some example embodiments.

FIG. 2 is a diagram illustrating a product detail page according to some example embodiments.

A product detail page may be, for example, a single detail page (SDP). Referring to FIG. 2, a single detail page 210 may include a first area 220 in which an image of a product is displayed, a second area 230 in which brand information of the product is displayed, and a third area 240 in which product information is displayed. The brand information of the product displayed in the second area 230 may include logo content of the corresponding brand, a brand name 232, and a link 233 of a page introducing a product of the corresponding brand. The product information displayed in the third area 240 may include a product name 241, a product price, and review information of the product.

Meanwhile, in FIG. 2, the image of the product displayed in the first area 220 and the product name and price information displayed in the third area 240 may be provided based on product information received from a seller terminal. In contrast, the brand name 232 and the logo content 231 of the second area may be retrieved by an electronic apparatus based on the product information received from the seller terminal.

If the brand name is included in the product name among the product information received from the seller terminal, the electronic apparatus may exclude the brand name in the product name and provide remaining information of the product name to the user terminal. For example, when the product name 241 of the product information received from the seller terminal is "A-brand white sneakers AA-XXX," if "A-brand white sneakers AA-XXX" is displayed without a change, information on or regarding the brand name 232 of the second area 230 may be displayed with being duplicated. In this case, remaining information "white sneakers AA-XXX" obtained by excluding "A-brand" from "A-brand white sneakers AA-XXX" may be provided to the user terminal. As such, the method of the present disclosure may prevent the same information from being duplicated.

In addition, even when the brand information included in the product name 241 of the product information received from the seller terminal and the brand name 232 displayed in the second area 230 are provided in different languages, the electronic apparatus may exclude the brand name from the product name and then provide the remaining information of the product name to the user terminal. For example, even when the product name 241 among the product information received from the seller terminal is "A-brand while sneakers AA-XXX," the remaining information "while sneakers AA-XXX" obtained by excluding "A-brand" may be provided to the user terminal.

In some example embodiments, when the electronic apparatus displays brand information in the second area 230 only for a genuine product, the user may easily verify from the second area 230 that the corresponding product is authorized by the brand.

Further, the method of the present disclosure may generate a new image by recognizing logo content from an image of a product displayed in the first area 220 and cropping one area including the recognized logo content. The generated image may be displayed in the first area 220. Referring to FIG. 2, the method of the present disclosure may recognize one area 225 including a logo of A-brand from an image related to a shoe product, and then generate the one area 225 into a new image. Also, in response to a sliding input being applied to the first area 220, the generated image may be displayed.

Figure 3:
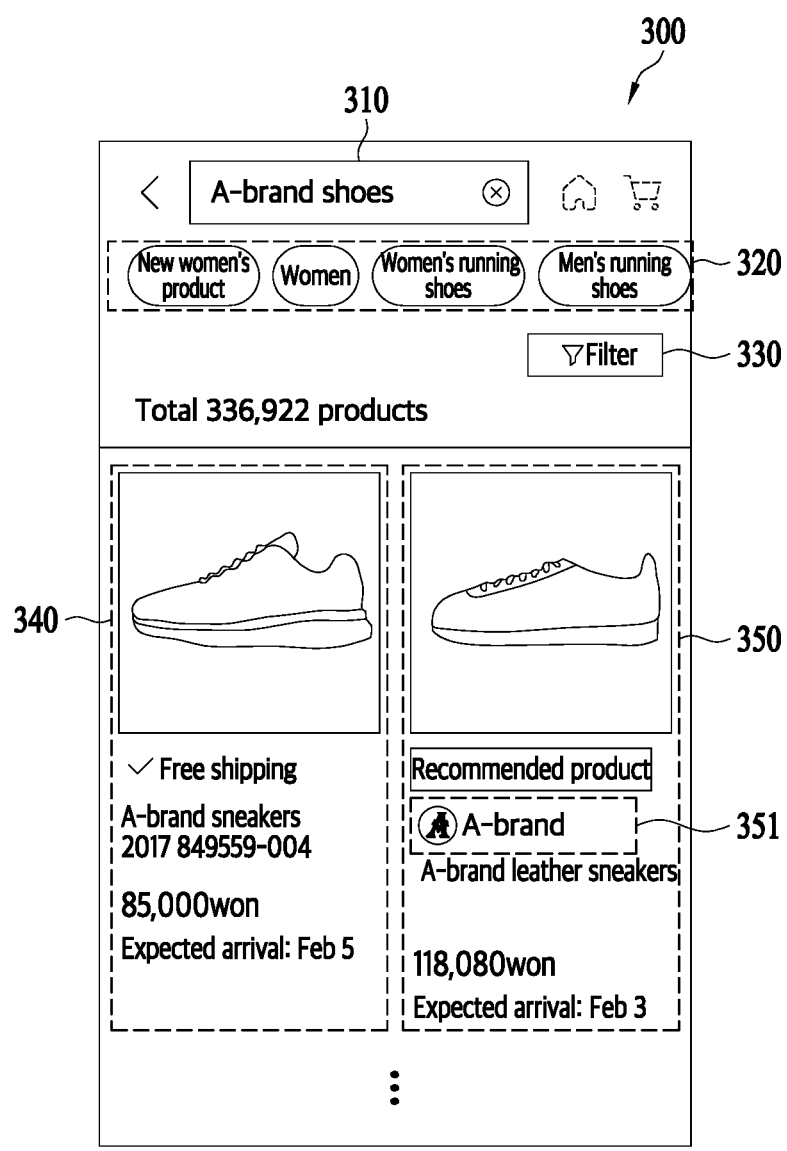
FIG. 3 is a diagram illustrating a product search page according to some example embodiments.

FIG. 3 is a diagram illustrating a product search page according to some example embodiments.

A product search page may be, for example, a search result page (SRP). Referring to FIG. 3, a search result page 300 may include a search word enter area 310, a fourth area 320 in which a keyword related to a search word is displayed, and a fifth area in which a product search result is displayed. The fifth area may include a left portion 340 and a right portion 350. Also, the search result page 300 may further include a button 330 to provide a function of filtering the product search result.

For example, when "A-brand shoes" is input to the search word enter area 310, the electronic apparatus may display keywords (new women's product, women, women's running shoes, men's running shoes, etc.) related to shoes in the fourth area 320.

Meanwhile, as a search result of the A-brand shoes, a first product and a second product may be found. In this case, based on brand identification results of the first product and the second product, information on the products may be differently displayed. For example, in a case of the first product for which brand identification is not completed, information on the first product may be displayed as shown in the left portion 340 of the fifth area. Also, in a case of the second product for which brand identification is completed, information on the second product may be displayed as shown in the right portion 350 of the fifth area. Specifically, the right portion 350 of the fifth area may include a brand information display area 351 of the second product. The brand information display area 351 of the second product may include a brand name and logo content of the corresponding brand. In addition, a brand shop page link (">" of the brand information display area 351) composed of information on a product for which brand identification is completed may be further included. Here, a brand identification procedure may refer to a procedure for performing a determination whether a seller is an official seller who sells products of a specific brand based on information received from the seller.

Meanwhile, the configurations of the product-related pages of FIGS. 2 and 3 are merely an example, and it is apparent for those skilled in the art that the configuration may vary based on implementation of a user interface.

Figure 4:
FIG. 4 is a diagram illustrating a page introducing a product of a specific brand according to some example embodiments.

FIG. 4 is a diagram illustrating a page introducing a product of a specific brand according to some example embodiments.

According to some example embodiments, an electronic apparatus may provide a brand shop page to a user. The brand shop page may refer to a page including information on products verified as a specific brand.

Referring to FIG. 4, a brand shop page 400 may include a search word enter area 410, a category display area 420, and a product information display area 430. The category display area 420 may vary based on a product provided from each brand shop.

Meanwhile, an order in which information on products provided in the product information display area 430 is displayed may be different for each user. In addition, as illustrated in FIG. 4, in the product information display area 430, a new product and a popular product may be displayed first. However, a method of displaying the information on the products is not limited thereto.

Figure 5:
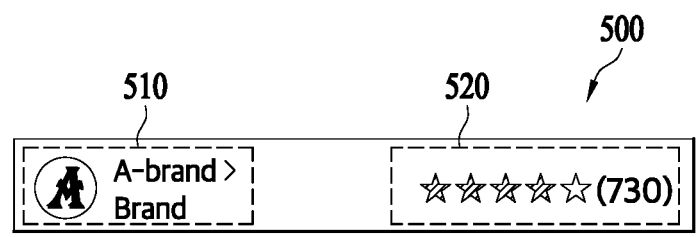
FIG. 5 is a diagram illustrating a provided product brand name and searched logo content according to some example embodiments.

FIG. 5 is a diagram illustrating a provided product brand name and searched logo content according to some example embodiments.

According to some example embodiments, contents displayed in the second area 230 of FIG. 2 and the brand information display area 351 of FIG. 3 may not be limited.

Referring to FIG. 5, the second area 230 of FIG. 2 and the brand information display area 351 of FIG. 3 may be displayed similar to a seventh area 500. Specifically, the seventh area 500 may further include an area 520 in which review information on a product is displayed in addition to an area 510 in which a brand name and logo content mapped to the brand name are displayed.

Also, the seventh area 500 of FIG. 5 may include ">", replacing the link 233 of the page introducing the product of the corresponding brand in the second area 230 of FIG. 2. An electronic apparatus may provide the page introducing the product of the corresponding brand based on a user input to ">."

Figure 6:
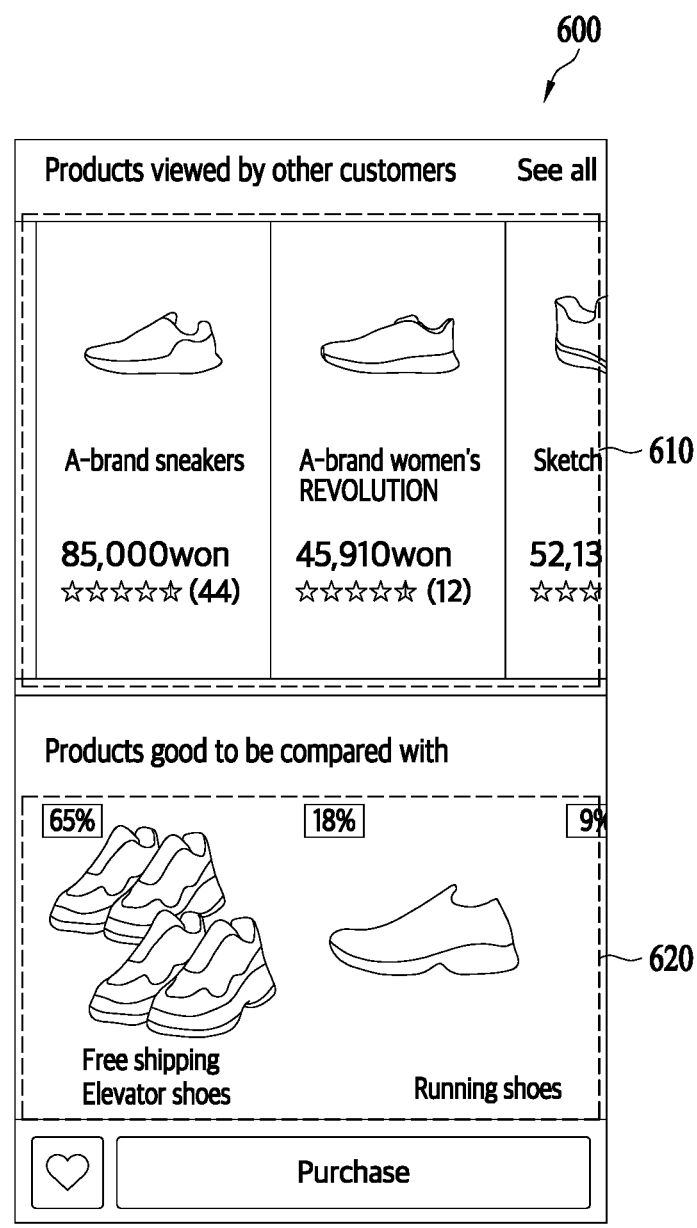
FIG. 6 is a diagram illustrating a method of providing recommendation information of similar products on a product detail page according to some example embodiments.

FIG. 6 is a diagram illustrating a method of providing recommendation information of similar products on a product-related page according to some example embodiments.

According to some example embodiments, an electronic apparatus may provide recommendation information regarding products similar to a specific product on a product-related page so as to be viewed by a user. Here, the products similar to the corresponding product may include, for example, a product of a same item of a same brand as that of the corresponding product, a product of a different item of the same brand as that of the corresponding product, and a product of the same item of a different brand but are not limited thereto.

For example, when the user scrolls down the product-related page, the recommendation information may be provided to the user as shown in FIG. 6. Specifically, an area 600 in which recommendation information is displayed may include an area 610 that shows information on or regarding products identified along with the corresponding product by other users who have searched for the corresponding product or identified product detail information of the corresponding product and an area 620 that shows information on products recommended to be compared with the corresponding product, which have been identified by the electronic apparatus.

Figure 7:
FIG. 7 is a diagram illustrating applicable filtering options in a product search page according to some example embodiments.

FIG. 7 is a diagram illustrating applicable filtering options in a product search page according to some example embodiments.

According to some example embodiments, an electronic apparatus may filter a product search result on a product search page and provide a filtering result to a user terminal. Here, the applicable filtering options may include brand information.

For example, when the button 330 of FIG. 3 for providing a function to filter a product search result is clicked, the electronic apparatus may provide filtering options to a user as illustrated in FIG. 7. When an input related to a size is received among the filtering options, the electronic apparatus may provide the user with information on a product of a selected size among product search results.

Here, the filtering options may include the brand information. When filtering based on the brand information, the electronic apparatus may provide a product verified as a specific brand to the user as a filtering result. Referring to FIG. 7, the user may select "A-brand" from the filtering options as indicated by reference numeral 710. The electronic apparatus may perform filtering to obtain products verified as corresponding to "A-brand" from the product search results and provide a result of the filtering to the user. Accordingly, through the method and the electronic apparatus of the present disclosure, a user interested in a product of a specific brand may easily acquire desired information.

Figure 8:
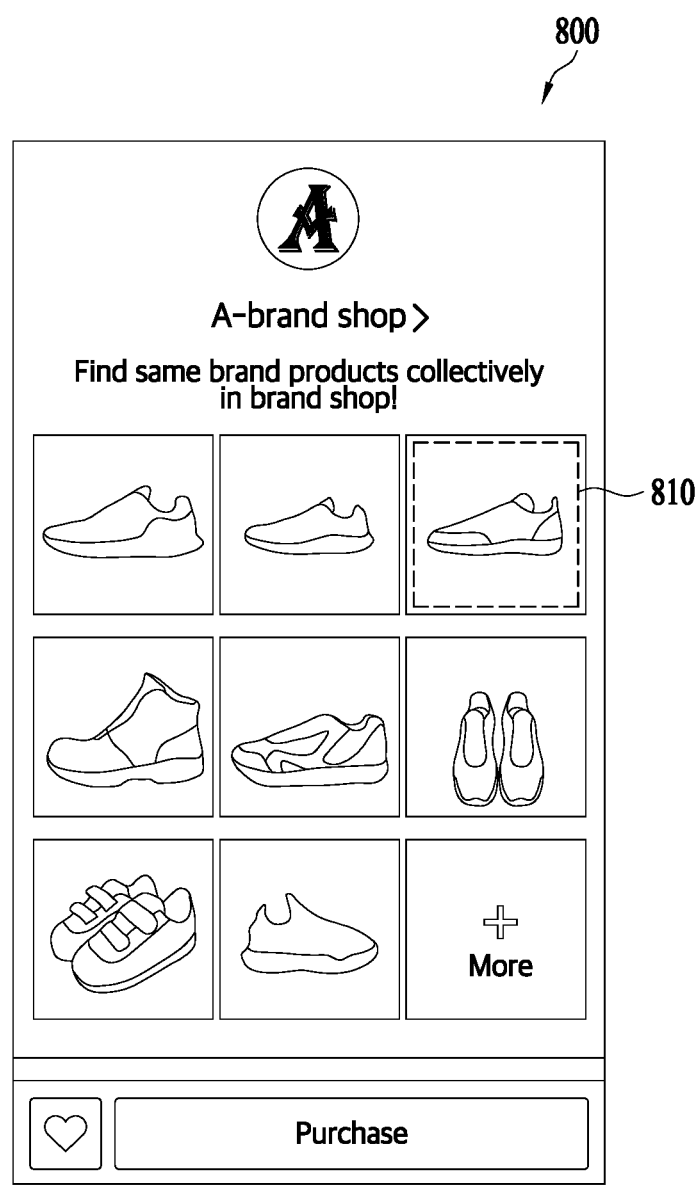
FIG. 8 is a diagram illustrating a method of providing a quick view of a page introducing a product of a specific brand in a product-related page according to some example embodiments.

FIG. 8 is a diagram illustrating a method of providing a quick view of a page introducing a product of a specific brand on a product-related page according to some example embodiments.

According to some example embodiments, an electronic apparatus may provide a quick view of a page introducing a product of a specific brand on a product-related page. In other words, the electronic apparatus may provide a portion of information on products available for purchase in a brand shop related to the product on at least one of a product detail page and a search result page.

For example, when a user scrolls down the product-related page, a quick view 800 of the brand shop may be identified as illustrated in FIG. 8. Specifically, the user may select the link 233 of the page introducing products of the corresponding brand shown in FIG. 2, thereby identifying the brand shop page 400 of FIG. 4. Also, the user may scroll down the product-related page, thereby identifying the quick view 800 of the brand shop.

The information on the products provided on the quick view 800 of the brand shop may be brief information compared to the information on the products provided on the brand shop page 400 of FIG. 4. For example, the quick view 800 of the brand shop may provide only an image related to the product. For example, based on an input applied by the user to the image 810, a page including detailed information of the corresponding product may be displayed.

Meanwhile, the quick view 800 of the brand shop is not limited to the example of FIG. 8, and a quick view in any form of including brief information on the product of the corresponding brand as compared to the brand shop page 400 may be applicable.

Further, according to some example embodiments, a list of the products provided in a form of the quick view may be determined based on a type of product searched from the product-related page. For example, when searching the product-related page for A-brand shoes, products shown in a list of products among the products provided in the form of the quick view may be other shoes of A-brand.

Figure 9:
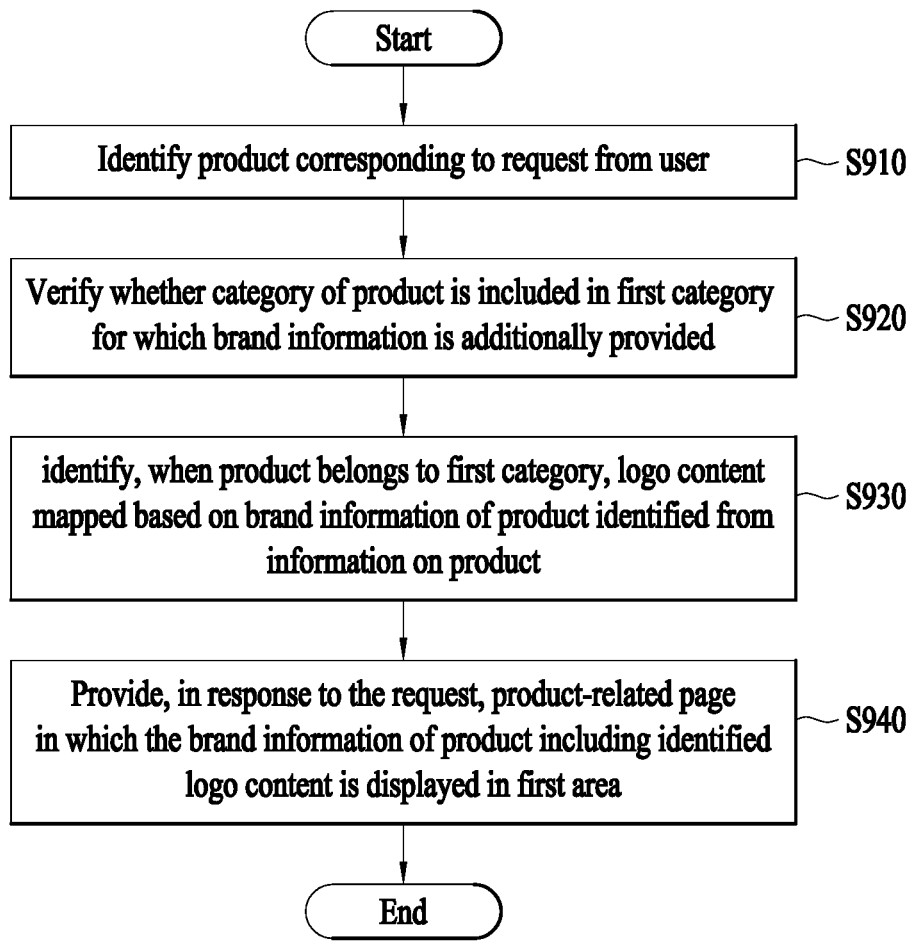
FIG. 9 is a flowchart illustrating a method of providing brand information of a product according to some example embodiments.

FIG. 9 is a flowchart illustrating a method of providing brand information of a product according to some example embodiments.

In operation S910, the method of the present disclosure may identify a product corresponding to a request from a user.

In operation S920, the method of the present disclosure may verify whether a category of the product is included in a first category for which brand information is additionally provided.

In operation S930, when the product belongs to the first category, the method of the present disclosure may identify logo content mapped based on brand information of the product identified from information on the product. When logo content mapped to the brand information is not identified, a generic icon may be identified as logo content mapped to the brand information.

In operation S940, in response to the request, the method of the present disclosure may provide a product-related page in which the brand information of the product including the identified logo content is displayed in a first area. The brand information may further include at least one of a brand name of the product and a link of a page providing information on or regarding a product set of a same brand as a brand of the product. The product information may include product information received from a seller of the product and certification information of the product, Also, in operation S940, when the brand information includes a brand name of the product, a name of the product may be displayed in a second area of the product-related page by excluding the brand name included in the name of the product. The brand name included in the brand information may be provided in a first language. The brand name of the product included in the name of the product may be provided in a second language.

Meanwhile, the method of the present disclosure may further include an operation of providing, on the product-related page, recommendation information regarding products of brands similar to a brand of the product among products belonging to the first category. The recommendation information may be determined based on user information.

Meanwhile, a type of the product-related page may include at least one of a detail page of the product and a search page related to the product.

When the product-related page is the search page related to the product, operation S940 may include an operation of providing a product search result based on a search word associated with the search page related to the product and an operation of filtering the product search result in response to an input corresponding to the brand information provided in the product search result and providing a filtering result. The filtering result may include product information corresponding to the brand information.

When the product-related page is the search page related to the product, and when the search word associated with the search page includes at least one of a name of the product and the brand name of the product, operation S920 may verify whether the category of the product is included in the first category based on the search word.

Meanwhile, when the product-related page is the detail page of the product, operation S920 may verify whether the category is included in the first category based on product information acquired from the seller of the product.

Further, the method of the present disclosure may provide, based on the brand information, a quick view of a page in which a product of a same brand as a brand of the product is introduced.

Meanwhile, when the product-related page is a detail page of the product, operation S940 may include an operation of identifying an image including a logo of the product among a plurality of images providing information on the product based on the brand information of the product identified from the information on the product, an operation of generating an image by cropping an area including the logo of the product from the identified image, and an operation of providing the generated image on the detail page of the product.

Figure 10:
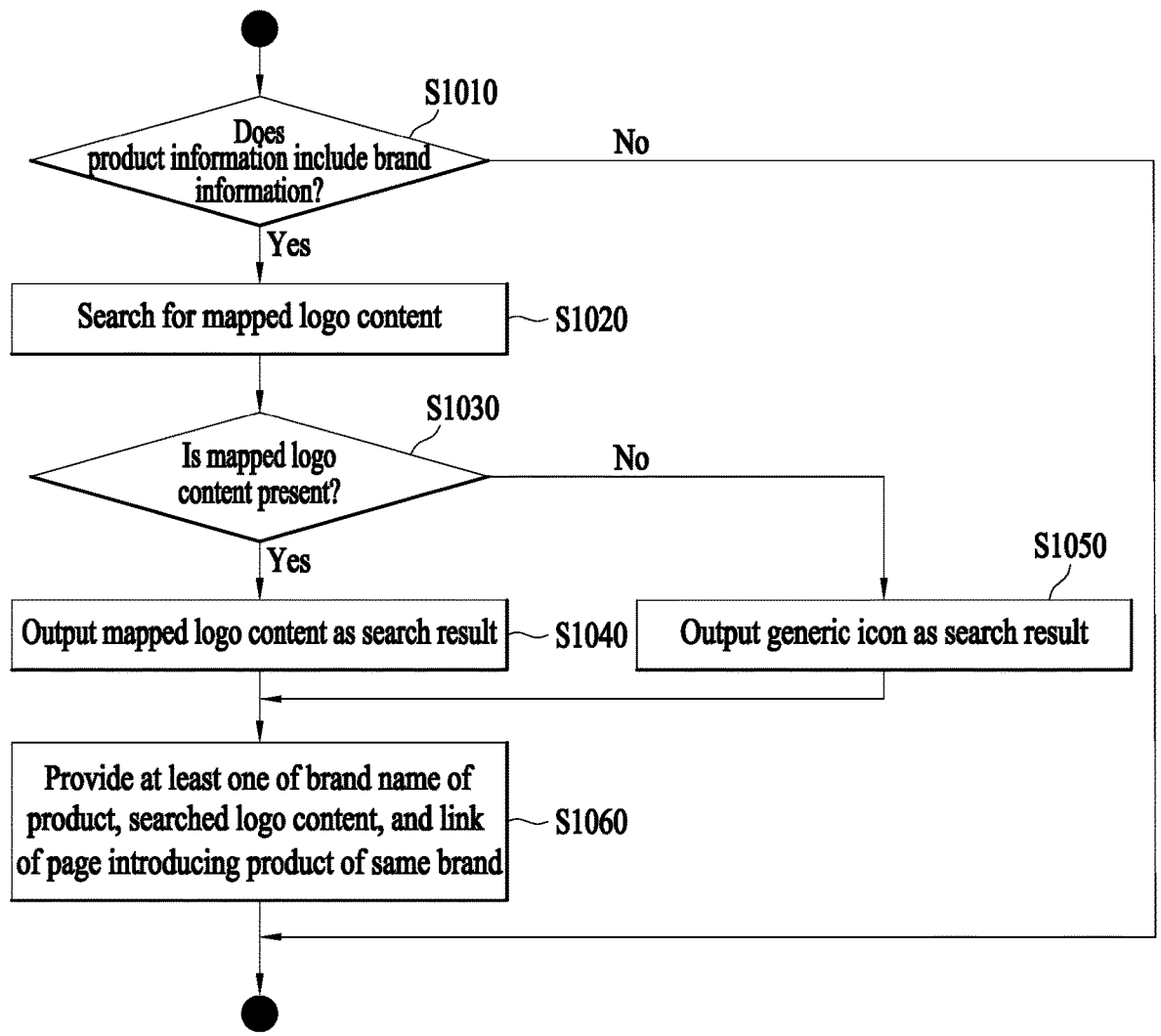
FIG. 10 is a flowchart illustrating a method of providing brand information of a product according to some example embodiments.

FIG. 10 is a flowchart illustrating a method of providing brand information of a product according to some example embodiments.

In operation S1010, the method of the present disclosure may determine whether product information received from a seller terminal includes brand information of a product. For example, when a product is registered in an online store, a brand name of the product may be input by a seller terminal. For example, in response to the brand name being input, it may be verified whether a document for proving whether the seller is an official seller who is entitled to sell products of the corresponding brand is present in the information received from the seller terminal.

If the product information includes the brand information of the product, operation S1020 may be performed. Otherwise, the method according to some example embodiments may terminate.

In operation S1020, the method of the present disclosure may verify whether logo content mapped to the brand information identified from the product information is present. Since detailed content of operation S1020 may correspond to operation S930 of FIG. 9, redundant description is omitted.

In operation S1030, the method of the present disclosure may determine whether logo content mapped to the brand information included in the product information is present.

If the mapped logo content is present, operation S1040 may be performed. Otherwise, operation S1050 may be performed.

In operation S1040, the method of the present disclosure may output the logo content mapped to a brand of the product.

In operation S1050, the method of the present disclosure may output a generic icon as the mapped logo content. The generic icon may be an icon that is constantly maintained irrespective of the product and the brand information. In other words, when the logo content mapped to the identified brand information of the product is not found, the electronic apparatus may output a specific icon as logo content to be provided on the corresponding product-related page. In this case, although there is no logo content of a brand of the corresponding product, the user may recognize that the product is a product verified as the corresponding brand.

In operation S1060, the method of the present disclosure may provide a product-related page in which the brand information of the product including the identified logo content is displayed.

Figure 11:
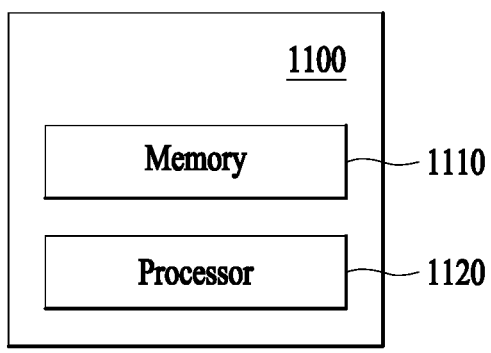
FIG. 11 is a block diagram illustrating an electronic apparatus according to some example embodiments.

FIG. 11 is a block diagram illustrating an electronic apparatus according to some example embodiments.

An electronic apparatus 1100 may include a memory 1110 and a processor 1120. The electronic apparatus 1100 illustrated in FIG. 11 shows components related to some example embodiments. Accordingly, it would be understood by those skilled in the art that general-purpose components other than the components shown in FIG. 11 may be further included.

The memory 1110 is hardware storing various types of data processed in the electronic apparatus 1100, and the memory 1110 may store, for example, data processed or to be processed in the electronic apparatus 1100. The memory 1110 may store at least one instruction for operating the processor 1120. In addition, the memory 1110 may store programs or applications to be executed by the electronic apparatus 1100. The memory 1110 may include random access memory (RAM) such as dynamic random access memory (DRAM) and static random access memory (SRAM), read-only memory (ROM), electrically erasable programmable read-only memory (EEPROM), CD-ROM, Blu-ray or other optical disc storage, hard disk drive (HDD), solid state drive (SSD), and flash memory.

The processor 1120 may control overall operations of the electronic apparatus 1100 and process data and signals. The processor 1120 may overall control the electronic apparatus 1100 by executing at least one instruction or at least one program stored in the memory 1110. The processor 1120 may be implemented as a central processing unit (CPU), a graphics processing unit (GPU), or an application processor (AP), but not limited thereto.

The processor 1120 may identify a product corresponding to a request from a user, verify whether a category of the product is included in a first category for which brand information is additionally provided, identify, when the product belongs to the first category, logo content mapped based on brand information of the product identified from information on the product, and provide, in response to the request, a product-related page in which the brand information of the product including the identified logo content is displayed in a first area. The brand information may further include at least one of a brand name of the product and a link of a page providing information on a product set of a same brand as a brand of the product.

The product information may include product information received from a seller of the product and certification information of the product.

Meanwhile, when logo content mapped to the brand information is not identified, a generic icon may be identified as logo content mapped to the brand information.

Also, when the brand information includes a brand name of the product, a name of the product may be displayed in a second area of the product-related page by excluding the brand name included in the name of the product. The brand name included in the brand information may be provided in a first language. The brand name of the product included in the name of the product may be provided in a second language.

Meanwhile, the processor 1120 may provide, on the product-related page, recommendation information regarding products of brands similar to a brand of the product among products belonging to the first category. The recommendation information may be determined based on user information.

Meanwhile, a type of the product-related page may include at least one of a detail page of the product and a search page related to the product.

When the product-related page is the search page related to the product, a product search result may be provided based on a search word associated with the search page related to the product. Also, in this case, the product search result may be filtered in accordance with an input corresponding to the brand information provided in the product search result, so that a filtering result is provided. The filtering result may include product information corresponding to the brand information.

Meanwhile, when the product-related page is the search page related to the product, and when the search word associated with the search page includes at least one of a name of the product and the brand name of the product, whether the category of the product is included in the first category may be verified based on the search word.

Meanwhile, when the product-related page is the detail page of the product, whether the category is included in the first category may be verified based on product information acquired from the seller of the product.

Meanwhile, based on the brand information, the processor 1120 may provide a quick view of a page in which a product of a same brand as a brand of the product is introduced.

Meanwhile, when the product-related page is a detail page of the product, an image including a logo of the product is identified from a plurality of images providing information on or regarding the product based on the brand information of the product identified from the information on the product. Also, an image may be generated by cropping an area including the logo of the product from the identified image. The generated image may be provided on the detail page of the product.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

Embodiments may be represented by functional blocks and various processing steps. These functional blocks may be implemented by various numbers of hardware and/or software configurations that execute specific functions. For example, some embodiments may adopt direct circuit configurations such as a memory, a processor, a logic circuit, and a look-up table that may execute various functions by control of one or more microprocessors or other control devices. Similarly to that elements may be executed by software programming or software elements, some embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, some embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method operable by an electronic apparatus to provide product information, the method comprising:
receiving, via a communication component of the electronic apparatus, a request from a user via a user terminal;
identifying, by a processor of the electronic apparatus, a product corresponding to the request;
determining, by the processor of the electronic apparatus, whether the product belongs to a first category of products, wherein brand information is provided for products of the first category;
in response to a determination that the product belongs to the first category, identifying, by the processor of the electronic apparatus, a logo content for the product based on the brand information of the product;
generating, by the processor of the electronic apparatus, an updated image of the logo content based on accessing an image of the product, recognizing the logo content in the accessed image, and cropping an area of the accessed image that includes the recognized logo content; and
providing, by the processor of the electronic apparatus, code configured to cause the user terminal to display a page related to the product, the page related to the product comprising a first area configured to display the brand information of the product and the updated image of the logo content,
wherein the brand information further comprises at least one of: a brand name of the product or a link of a page providing information regarding a product set of a same brand as a brand of the product.

2. The method of claim 1, wherein the page related to the product comprises product information received from a seller of the product and certification information of the product.

3. The method of claim 1, wherein in response to determining that the logo content is not identified, the identifying of the logo content comprises identifying a generic icon as a logo content mapped to the brand information.

4. The method of claim 1, wherein in response to determining that the brand information comprises the brand name of the product, the providing of the page related to the product comprises displaying a name of the product in a second area of the page related to the product by excluding the brand name included in the name of the product.

5. The method of claim 4, wherein:
the brand name included in the brand information is provided in a first language; and
the brand name of the product included in the name of the product is provided in a second language.

6. The method of claim 1, further comprising:
providing, on the page related to the product, recommendation information regarding products of brands similar to the brand of the product among products belonging to the first category.

7. The method of claim 6, wherein the recommendation information is determined based on user information.

8. The method of claim 1, wherein a type of the page related to the product comprises at least one of: a detail page of the product or a search page related to the product.

9. The method of claim 8, wherein the providing of the page related to the product comprises:
providing, when the page related to the product is the search page related to the product, a product search result based on a search word associated with the search page related to the product; and
filtering the product search result in accordance with an input corresponding to the brand information provided in the product search result and providing a filtering result,
wherein the filtering result comprises product information corresponding to the brand information.

10. The method of claim 9, wherein in response to determining that the page related to the product is the search page related to the product, and in response to determining that the search word associated with the search page comprises at least one of a name of the product or the brand name of the product, the determining whether the product belong to the first category of products comprises determining whether the product belongs to the first category based on the search word.

11. The method of claim 8, wherein in response to determining that the page related to the product is the detail page of the product, the determining of whether the product belongs to the first category is based on product information acquired from a seller of the product.

12. The method of claim 1, further comprising:
providing, based on the brand information, a quick view of a page in which another product of the brand of the product is introduced.

13. A non-transitory computer-readable recording medium storing thereon computer-readable instructions that, when executed by a processor of an electronic apparatus, cause the processor to:
receive a request from a user via a user terminal;
identify a product corresponding to the request;
determine whether the product belongs to a first category of products, wherein brand information is provided for products of the first category;
in response to a determination that the product belongs to the first category, identify a logo content for the product based on the brand information of the product;
generate an updated image of the logo content based on accessing an image of the product, recognize the logo content in the accessed image, and crop an area of the accessed image that includes the recognized logo content; and
provide code configured to cause the user terminal to display a page related to the product, the page related to the product comprising a first area configured to display the brand information of the product and the updated image of logo content,
wherein the brand information further comprises at least one of: a brand name of the product or a link of a page providing information regarding a product set of a same brand as a brand of the product.

14. An electronic apparatus for providing brand information of a product, the electronic apparatus comprising:
a memory in which at least one instruction is stored; and
a processor, the processor being configured to execute the at least one instruction to:
receive, via a communication component of the electronic apparatus, a request from a user via a user terminal;
identify a product corresponding to the request;
determine whether the product belongs to a first category of products, wherein brand information is provided for products of the first category;
in response to a determination that the product belongs to the first category, identify a logo content for the product based on the brand information of the product;
generate an updated image of the logo content based on accessing an image of the product, recognize the logo content in the accessed image, and crop an area of the accessed image that includes the recognized logo content; and
provide code configured to cause the user terminal to display a page related to the product, the page comprising a first area configured to display in which the brand information of the product and the updated image of the logo content,
wherein the brand information further comprises at least one of: a brand name of the product or a link of a page providing information regarding a product set of a same brand as a brand of the product.

* * * * *

UNITED STATES PATENT AND TRADEMARK OFFICE
CERTIFICATE OF CORRECTION

| | | |
|---|---|---|
| PATENT NO. | : 11,295,365 B1 | Page 1 of 1 |
| APPLICATION NO. | : 17/221630 | |
| DATED | : April 5, 2022 | |
| INVENTOR(S) | : Jun Young Mun | |

It is certified that error appears in the above-identified patent and that said Letters Patent is hereby corrected as shown below:

On the Title Page

At page 2, item (56) Line 18, delete "etal," and insert --et al.,--.

At page 2, item (56) Line 18, delete "Anmad" and insert --Ahmad--.

In the Specification

At Column 9, Line 65, delete "51030," and insert --S1030,--.

In the Claims

At Column 14, Claim 14, Line 49, delete "in which".

Signed and Sealed this
Twenty-fifth Day of October, 2022

Katherine Kelly Vidal
*Director of the United States Patent and Trademark Office*